(12) United States Patent
Nakata (10) Patent No.: US 10,851,735 B2
(45) Date of Patent: Dec. 1, 2020

(54) FAULT DIAGNOSIS DEVICE (71) Applicant: DENSO CORPORATION, Kariya (JP)

(72) Inventor: Rei Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 16/063,393

(22) PCT Filed: Oct. 28, 2016

(86) PCT No.: PCT/JP2016/082007
§ 371 (c)(1),
(2) Date: Jun. 18, 2018

(87) PCT Pub. No.: WO2017/110243
PCT Pub. Date: Jun. 29, 2017

(65) Prior Publication Data
US 2018/0372028 A1  Dec. 27, 2018

(30) Foreign Application Priority Data
Dec. 22, 2015 (JP) .................. 2015-250278

(51) Int. Cl.
*F02M 25/08* (2006.01)
*G01M 15/04* (2006.01)
*B60K 15/03* (2006.01)
*B60K 15/035* (2006.01)

(52) U.S. Cl.
CPC ......... *F02M 25/0836* (2013.01); *B60K 15/03* (2013.01); *F02M 25/08* (2013.01); *F02M 25/0809* (2013.01); *F02M 25/089* (2013.01); *B60K 2015/0348* (2013.01); *B60K 2015/03302* (2013.01); *B60K 2015/03514* (2013.01); *G01M 15/04* (2013.01)

(58) Field of Classification Search
CPC ............... F02M 25/0836; F02M 25/08; F02M 25/0809; F02M 25/089; B60K 15/03; B60K 2015/03302; B60K 2015/0348; B60K 2015/03514; G01M 15/04
USPC ......................................................... 123/520
See application file for complete search history.

(56) References Cited

U.S. PATENT DOCUMENTS

| | | | | |
|---|---|---|---|---|
| 9,133,796 B2* | 9/2015 | Plymale | ............ | F02M 25/0836 |
| 2006/0179928 A1* | 8/2006 | Shikama | ............ | F02M 25/0809 |
| | | | | 73/114.39 |
| 2006/0272400 A1* | 12/2006 | Wakahara | ......... | F02M 25/0809 |
| | | | | 73/114.37 |
| 2010/0223984 A1* | 9/2010 | Pursifull | ............ | F02M 25/0836 |
| | | | | 73/114.39 |
| 2013/0199504 A1* | 8/2013 | Takeishi | ............. | F02M 25/0809 |
| | | | | 123/520 |
| 2015/0308310 A1* | 10/2015 | Pursifull | .............. | F01M 13/022 |
| | | | | 123/403 |

(Continued)

*Primary Examiner* — David Hamoui
*Assistant Examiner* — John D Bailey
(74) *Attorney, Agent, or Firm* — Nixon & Vanderhye P.C.

(57) ABSTRACT

When the internal combustion engine is stopped, a pressure reduction pump performs a pressure reduction while a first open/close valve and a second open/close valve are closed. After that, a control unit determines whether a fault occurs in a second purge pipe between the second open/close valve and an intake pipe based on a measured value obtained by an obtaining portion immediately after the second open/close valve is opened.

5 Claims, 7 Drawing Sheets

(56) References Cited

U.S. PATENT DOCUMENTS

2016/0017849 A1* 1/2016 Shirai .............. F02M 35/10222
123/520
2016/0273493 A1* 9/2016 Ono .................. F02M 25/0809
2017/0314512 A1* 11/2017 Dudar ................ F02D 41/0032

* cited by examiner

FAULT DIAGNOSIS DEVICE

CROSS REFERENCE TO RELATED APPLICATION

This application is the U.S. national phase of International Application No. PCT/JP2016/082007 filed on Oct. 28, 2016 which designated the U.S. and claims priority to Japanese Patent Application No. 2015-250278 filed on Dec. 22, 2015 claiming a benefit of a right of priority, the entire contents of each of which are incorporated herein by reference.

TECHNICAL FIELD

The present disclosure relates to a fault diagnosis device which determines whether a fault occurs in an evaporative-gas purge pipe.

BACKGROUND ART

It is known that an internal combustion engine is provided with an evaporative-gas purge pipe for supplying (purging) evaporative-gas into an intake pipe, which is generated in a fuel tank. The evaporative-gas purge pipe connects a canister adsorbing evaporative-gas and an intake pipe introducing fresh air into the internal combustion engine. The evaporative-gas purge pipe is connected to the intake pipe downstream of the throttle valve.

An open/close valve is provided to the evaporative-gas purge pipe. When the open/close valve is opened, the evaporative-gas in the canister is suctioned into the evaporative-gas purge pipe by negative pressure generated in the intake pipe and is supplied to the intake pipe through the evaporative-gas purge pipe.

In a case where the internal combustion engine is provided with a supercharger, a compressor is provided to an intake pipe in order to feed air into the internal combustion engine. When the supercharger operates, air pressure downstream of the compressor becomes positive pressure. For this reason, it is likely that evaporative-gas may not be supplied to the intake pipe by using negative pressure for a long time period.

In order to supply evaporative-gas into an intake pipe even when the supercharger operates, it is proposed that an evaporative-gas purge pipe extending from a canister is branched to be connected to an intake pipe upstream of the compressor (refer to Patent Literature 1, for example).

When the supercharger operates, an interior of the intake pipe upstream of the compressor becomes slightly negative pressure. Thus, in an internal combustion engine having a configuration described in Patent Literature 1, the evaporative-gas can be supplied to the intake pipe through the branched evaporative-gas purge pipe (upstream purge pipe) when the supercharger operates.

Patent Literature 1 shows a fault diagnosis device which determines whether a fault occurs in the upstream purge pipe. The fault diagnosis device operates an open/close valve provided in the upstream purge pipe and determines whether a fault occurs according to a magnitude of pressure variation in the intake pipe.

Specifically, when the pressure in the intake pipe is significantly varied due to a switching of the open/close valve, it is determined that no fault occurs in the upstream purge pipe. Meanwhile, when the pressure in the intake pipe is less varied due to a switching of the open/close valve, it is determined that a fault occurs in the upstream purge pipe. For example, in a case where the upstream purge pipe has a hole or the pipe is disconnected from a connecting portion, a pressure variation in the intake pipe due to a switching of the open/close valve becomes small. As described above, an abnormality determination of the upstream purge pipe can be performed based on the magnitude of the pressure variation.

PRIOR ART LITERATURES

Patent Literature

[Patent Literature 1] Japanese Patent No. 4304513

SUMMARY OF INVENTION

When a fault diagnosis device described in Patent Literature 1 executes a determination, an intake pipe downstream of a compressor is always decompressed by an internal combustion engine. Thus, when the internal combustion engine is stopped, it cannot be determined whether a fault occurs in the upstream purge pipe.

Especially, in a case where the above fault diagnosis device is mounted on a plug-in hybrid vehicle of which internal combustion engine is frequently stopped, it is likely that a fault in an upstream purge pipe may not be detected for a long time period.

It is an object of the present disclosure to provide a fault diagnosis device which can determine whether a fault occurs in an evaporative-gas purge pipe even when an internal combustion engine is stopped.

According to the present disclosure, a fault diagnosis device determines whether a fault occurs in an evaporative-gas purge pipe which is provided to an internal combustion engine with a supercharger. The evaporative-gas purge pipe includes a first purge pipe through which an evaporative-gas generated in a fuel tank flows into an intake pipe downstream of a compressor, and a second purge pipe through which the evaporative-gas flows into the intake pipe upstream of the compressor. The intake pipe supplies an air to the internal combustion engine. The fault diagnosis device has a first open/close valve provided to the first purge pipe; a second open/close valve provided to the second purge pipe; a pressure reduction pump reducing both of a pressure in the first purge pipe between the first open/close valve and the fuel tank and a pressure in the second purge pipe between the second open/close valve and the fuel tank; an obtaining portion obtaining a flow rate information relating to a flow rate of an air flowing into the second purge pipe from the intake pipe; and a control unit controlling an operation of whole of the fault diagnosis device. When the internal combustion engine is stopped, the pressure reduction pump performs a pressure reduction while the first open/close valve and the second open/close are closed. The control unit determines whether a fault occurs in the second purge pipe between the second open/close valve and the intake pipe based on the flow rate information which is obtained immediately after the second open/close valve is opened.

The fault diagnosis device is provided with a pressure reduction pump which reduces both of a pressure in the first purge pipe between the first open/close valve and the fuel tank and a pressure in the second purge pipe between the second open/close valve and the fuel tank. Thus, even when the internal combustion engine is stopped, the above portion in the evaporative-gas purge pipe can be made into negative pressure.

Even when a pressure reduction pump performs a pressure reduction while the first open/close valve and the second open/close valve are closed, an interior of the second purge pipe between the second open/close valve and the intake pipe and an interior of the intake pipe are in atmospheric pressure. When the second open/close valve is opened under such a condition, air flows into the second purge pipe from the intake pipe temporarily.

A flow rate of air flowing into the second purge pipe from the intake pipe varies according to whether a fault occurs in the second purge pipe. For example, if a leakage occurs in the second purge pipe between the second open/close valve and the intake pipe, not only air from the intake pipe but also air from outside flows into the second purge pipe through a leakage portion. Thus, comparing with a case of no leakage, the flow rate of air flowing into the second purge pipe from the intake pipe becomes smaller.

According to the present disclosure, the fault diagnosis device has a control unit which determines whether a fault occurs in the second purge pipe between the second open/close valve and the intake pipe based on flow rate information which is obtained immediately after the second open/close valve is opened. The flow rate information is information which relates to flow rate of air flowing into the second purge pipe from the intake pipe. The flow rate information may be a flow rate itself, or a physical quantity which varies according to the flow rate.

With this configuration, even when the internal combustion engine is stopped, it can be determined whether a fault occurs in the second purge pipe based on the flow rate information.

According to the present disclosure, a fault diagnosis device can determine whether a fault occurs in an evaporative-gas purge pipe even when an internal combustion engine is stopped.

DESCRIPTION OF EMBODIMENTS

Referring to drawings, embodiments will be described hereinafter. In order to easily comprehend the description, the same component has the same reference numeral as much as possible, and the same explanation is not repeated.

Figure 1:
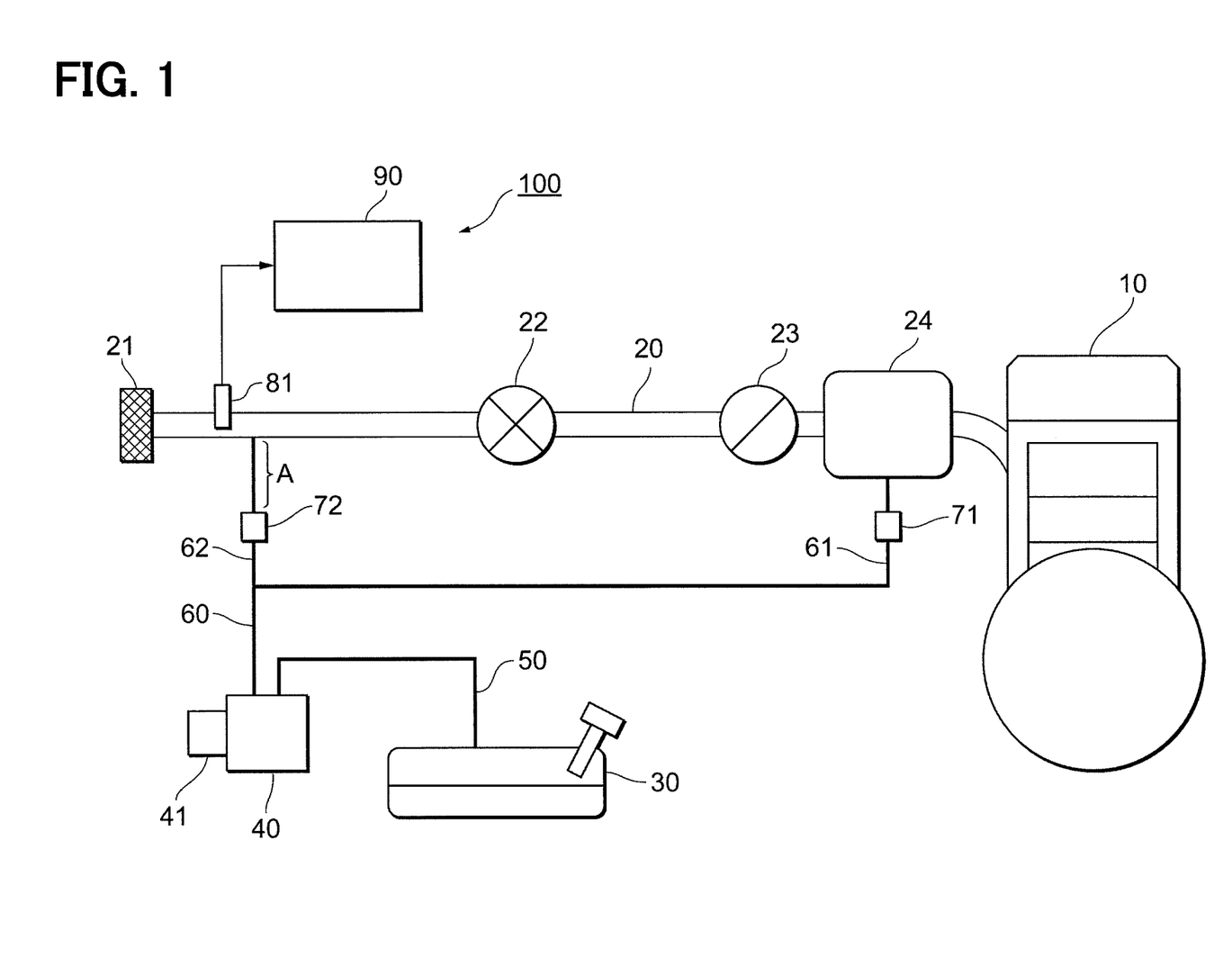
FIG. 1 is a chart schematically showing a fault diagnosis device and an internal combustion engine on which the fault diagnosis device is mounted, according to a first embodiment.

Referring to FIG. 1, a fault diagnosis device 100 according to a first embodiment will be described. The fault diagnosis device 100 is configured to determine whether a fault occurs in an evaporative-gas purge pipe 60 provided to an internal combustion engine 10. Before describing the fault diagnosis device 100, the internal combustion engine 10 and its vicinity will be described.

The internal combustion engine 10 is a four-cycle reciprocating engine which generates a driving force for a vehicle (not shown). The internal combustion engine 10 is driven by receiving fuel stored in a fuel tank 30. An intake pipe 20 is connected to the internal combustion engine 10 in order to intake fresh air for combustion. The internal combustion engine 10 is provided with an exhaust pipe for discharging combusted gas to outside of the internal combustion engine 10. In FIG. 1, the exhaust pipe is not shown.

An air filter 21, a compressor 22, a throttle valve 23, and an intake manifold 24 are provided to the intake pipe 20 in this series from its upstream (that is, from an opposite side to the internal combustion engine 10).

The air filter 21 is for removing foreign matters, such as dust, from the air introduced from the outside. An upstream portion of the intake pipe relative to the air filter 21 is opened to an outside space.

The compressor 22 is a part of a supercharger provided to the internal combustion engine 10. The compressor 22 is driven by exhaust gas flowing through the exhaust pipe to feed the air in the intake pipe 20 into the internal combustion engine 10. When the supercharger is not driven, the compressor 22 is stopped, so that an internal pressure of the intake pipe 20 is negative pressure lower than atmospheric pressure. Meanwhile, when the supercharger is driven, the compressor 22 compresses the air. Thus, the pressure in the intake pipe 20 downstream of the compressor 22 becomes relatively high pressure (positive pressure) which may be higher than the atmospheric pressure.

The throttle valve 23 is for adjusting an intake air flow rate supplied to the internal combustion engine 10 through the intake pipe 20. An opening degree of the throttle valve 23 depends on a stepped amount of an accelerator pedal stepped by a driver.

An intake manifold 24 is for distributing the air flowing through the intake pipe 20 into a plurality of cylinders of the internal combustion engine 10. FIG. 1 shows a single cylinder of the internal combustion engine 10.

The fuel tank 30 shown in FIG. 1 is a container for storing the fuel which will be supplied to the internal combustion engine 10. The fuel stored in the fuel tank 30 is supplied to the internal combustion engine 10 through a fuel supply pipe (not shown), and is injected into an interior of the internal combustion engine 10 through a fuel injector (not shown).

The fuel is evaporated in the fuel tank 30 to generate evaporative-gas in the fuel tank 30. The internal combustion engine 10 is provided with a purge system for purging the evaporative-gas into the intake pipe 20 in order to avoid a leakage of the evaporative-gas into an atmosphere. The purge system will be described hereinafter. The purge system includes a canister 40 and an evaporative-gas purge pipe 60.

The canister 40 contains adsorbents, such as activated carbon, which adsorbs the evaporative-gas. The canister 40 and the fuel tank 30 are connected with each other through a pipe 50. The evaporative-gas generated in the fuel tank 30 is supplied to the canister 40 through the pipe 50, and is adsorbed by the canister 40 temporarily.

The canister 40 is provided with a pressure reduction pump 41 which reduces the pressure inside of the evaporative-gas purge pipe 60. An operation of the pressure reduction pump 41 is controlled by a control unit 90 which will be described later. The pressure reduction pump 41 is a part of the fault diagnosis device 100. The pressure reduction pump 41 can measure pressure in the evaporative-gas purge pipe 60, and can transmit a measured value to the control unit 90. The pressure reduction pump 41 can measure pressure in the evaporative-gas purge pipe 60 in a vicinity of a connection between the evaporative-gas purge pipe 60 and the pressure reduction pump 41.

The evaporative-gas purge pipe 60 connects the canister 40 and the intake pipes 20. The evaporative-gas adsorbed by the canister 40 is supplied (purged) into the intake pipe 20 through the evaporative-gas purge pipe 60. The evaporative-gas purge pipe 60 extends from the canister 40 and is branched into two pipes. One of two pipes is connected to the intake manifold 24 of the intake pipe 20. The other is connected to a portion upstream of the compressor 22.

The evaporative-gas purge pipe 60 between a branch portion and the intake manifold 24 is referred to as a first purge pipe 61. The evaporative-gas purge pipe 60 between the branch portion and the portion upstream of the compressor 22 is referred to as a second purge pipe 62. The first purge pipe 61 introduces the evaporative-gas to the portion downstream of the compressor 22 in the intake pipes 20. The second purge pipe 62 introduces the evaporative-gas to the portion upstream of the compressor 22 in the intake pipes 20.

A configuration of the fault diagnosis device 100 will be described. The fault diagnosis device 100 has a first open/close valve 71, a second open/close valve 72 and a flow rate sensor 81 in addition to the pressure reduction pump 41 which is described above.

The first open/close valve 71 is an electromagnetic valve which is switched by electromagnetic force. The first open/close valve 71 is arranged at a middle of the first purge pipe 61. The first open/close valve 71 is switched between a position where the evaporative-gas is supplied to the intake pipe 20 through the first purge pipe 61 and a position where the evaporative-gas is not supplied to the intake pipe 20 through the first purge pipe 61. The operation of the first open/close valve 71 is controlled by the control unit 90.

The second open/close valve 72 is an electromagnetic valve which is switched by electromagnetic force. The second open/close valve 72 is arranged at a middle of the second purge pipe 62. The second open/close valve 72 is switched between a position where the evaporative-gas is supplied to the intake pipe 20 through the second purge pipe 62 and a position where the evaporative-gas is not supplied to the intake pipe 20 through the second purge pipe 62. The operation of the second open/close valve 72 is controlled by the control unit 90.

The flow rate sensor 81 is a flow meter which measures flow rate of air flowing through the intake pipe 20. The flow rate sensor 81 is arranged in the intake pipe 20 slightly upstream of a connecting portion between the second purge pipe 62 and the intake pipe 20 (at a side of air filter 21). The flow rate measured by the flow rate sensor 81 is transmitted to the control unit 90. The flow rate sensor 81 corresponds to an "obtaining portion" in the present embodiment.

The control unit 90 controls whole operation of the fault diagnosis device 100. The control unit 90 is a computer system including a CPU, a ROM, a RAM, etc. The control unit 90 controls operation of the first open/close valve 71, the second open/close valve 72, and the pressure reduction pump 41. The control unit 90 determines whether a fault occurs in the second purge pipe 62 between the second open/close valve 72 and the intake pipe 20 based on a variation in flow rate measured by the flow rate sensor 81. This detected area is referred to as a detection area "A", hereinafter.

Figure 2:
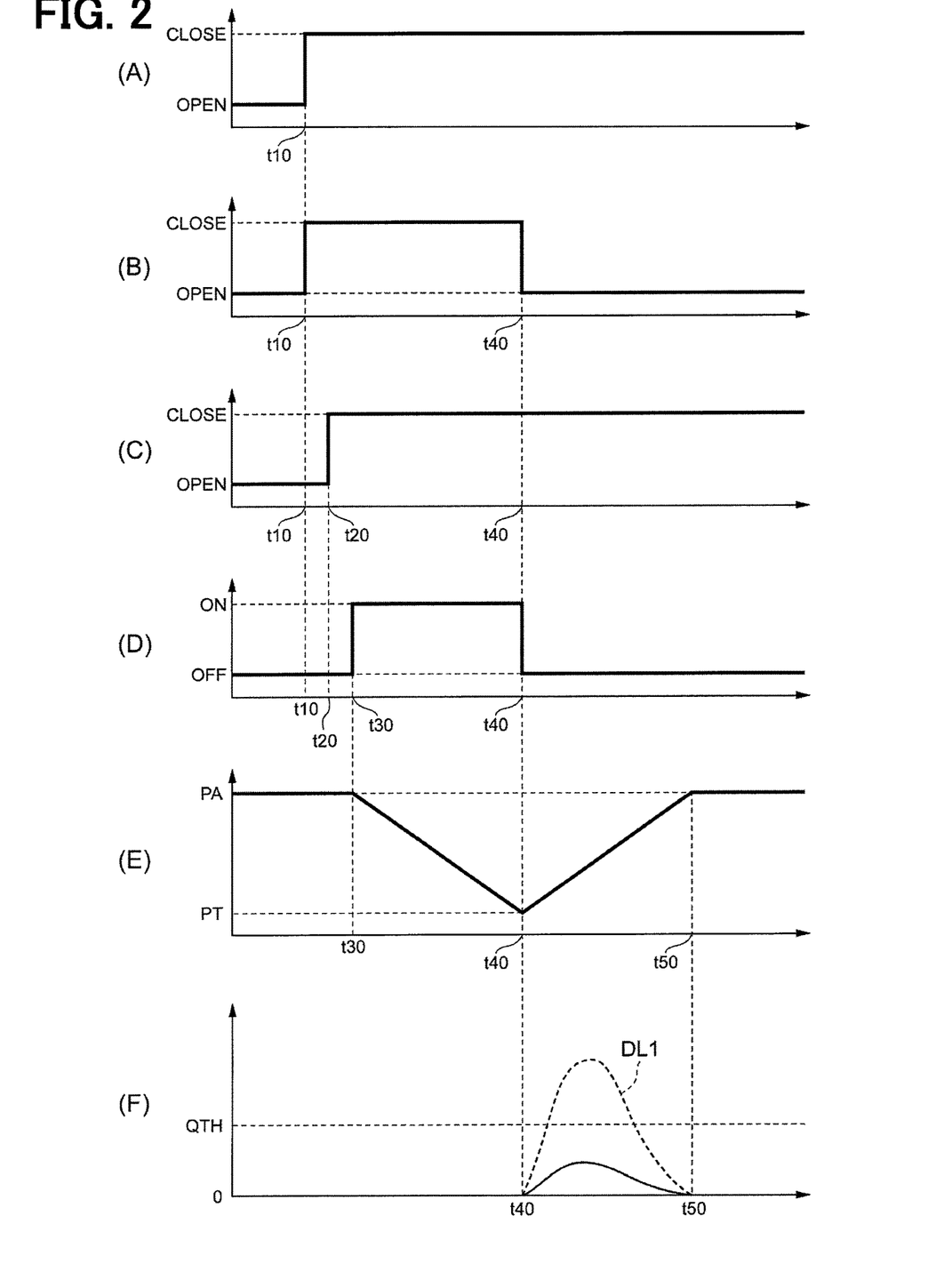
FIG. 2 is a time chart showing a condition change of each part when a diagnosis is executed by the fault diagnosis device shown in FIG. 1.

Referring to FIG. 2, an abnormality determination method which the fault diagnosis device 100 executes will be described. FIG. 2(A) shows a transition in open/close condition of the first open/close valve 71. FIG. 2(B) shows a transition in open/close condition of the second open/close valve 72. FIG. 2(C) shows a transition in open/close condition of the throttle valve 23. FIG. 2(D) shows a transition in operation condition of the pressure reduction pump 41. FIG. 2(E) shows a transition in pressure in the evaporative-gas purge pipe 60, which the pressure reduction pump 41 measures. FIG. 2(F) shows a transition in flow rate which is measured by the flow rate sensor 81.

The fault diagnosis device 100 executes the abnormality determination while the internal combustion engine 10 is stopped. At a time of t10, the first open/close valve 71 is closed (FIG. 2(A)). At the same time, the second open/close valve 72 is also closed (FIG. 2(B)). Then, at a time t20, the throttle valve 23 is fully closed (FIG. 2(C)). Above controls of the first open/close valve 71, the second open/close valve 72, and the throttle valve 23 are executed by the control unit 90.

At the time of t20, the pressure reduction pump 41 is stopped. Thus, the internal pressure of the evaporative-gas purge pipe 60, which pressure reduction pump 41 measures, is the atmospheric-pressure PA (FIG. 2 (E)).

At a time of t30 after the time of t20, the pressure reduction pump 41 which has been stopped is started to start a pressure reduction in the evaporative-gas purge pipe 60 (FIG. 2 (D)). Thus, after the time of t30, the internal pressure of the evaporative-gas purge pipe 60 close to the pressure reduction pump 41 relative to the first open/close valve 71 and the second open/close valve 72 is gradually decreased (FIG. 2(E)). This pressure is referred to as a measure pressure.

The control unit 90 stops the pressure reduction pump 41 at a time when the measure pressure falls to a specified threshold PT (FIG. 2 (D), FIG. 2 (E)). At a time of t40, the control unit 90 opens the second open/close valve 72 (FIG. 2 (B)). Thereby, since the air flows into the second purge pipe 62 from the intake pipe 20, the measure pressure is gradually increased after the time of t40. Moreover, the flow rate measured by the flow rate sensor 81 increases (FIG. 2 (F)).

The air in the intake pipe 20 flows into the second purge pipe 62 and the fresh air is introduced into the intake pipe 20 through the air filter 21. When the measure pressure rises to the atmospheric-pressure PA at a time of t50, the air flow into the second purge pipe 62 is stopped. The air flow rate measured by the flow rate sensor 81 starts to increase at the time of t40 and then starts to decrease immediately. Then, the air flow rate becomes zero at a timing close to the time of t50 (FIG. 2(F)).

When a fault occurs in the detection area "A" of the second purge pipe 62, the air flow rate measured by the flow rate sensor 81 becomes small after the time of t40. This is because outside air flows into the second purge pipe 62 through the abnormal portion and less air flows into the second purge pipe 62 from the intake pipe 20. FIG. 2(F) shows a case where the measured air flow rate is decreased due to a fault in the detection area "A". A dashed-line DL1 in FIG. 2(F) shows a variation in flow rate in a case where no fault occurs in the detection area "A".

The fault diagnosis device 100 according to the present embodiment determines whether a fault occurs in the detection area "A" based on the air flow rate measured by the flow rate sensor 81. Specifically, when the flow rate measured by the flow rate sensor 81 does not exceed a specified threshold QTH immediately after the second open/close valve 72 is opened, it is determined that a fault occurs in the second purge pipe 62 between the second open/close valve 72 and the intake pipe 20 (that is, in the detection area "A"). Meanwhile, when the flow rate measured by the flow rate sensor 81 exceeds the specified threshold QTH immediately after the second open/close valve 72 is opened as shown by the dashed-line DL1, it is determined that no fault occurs in the detection area "A".

Figure 3:
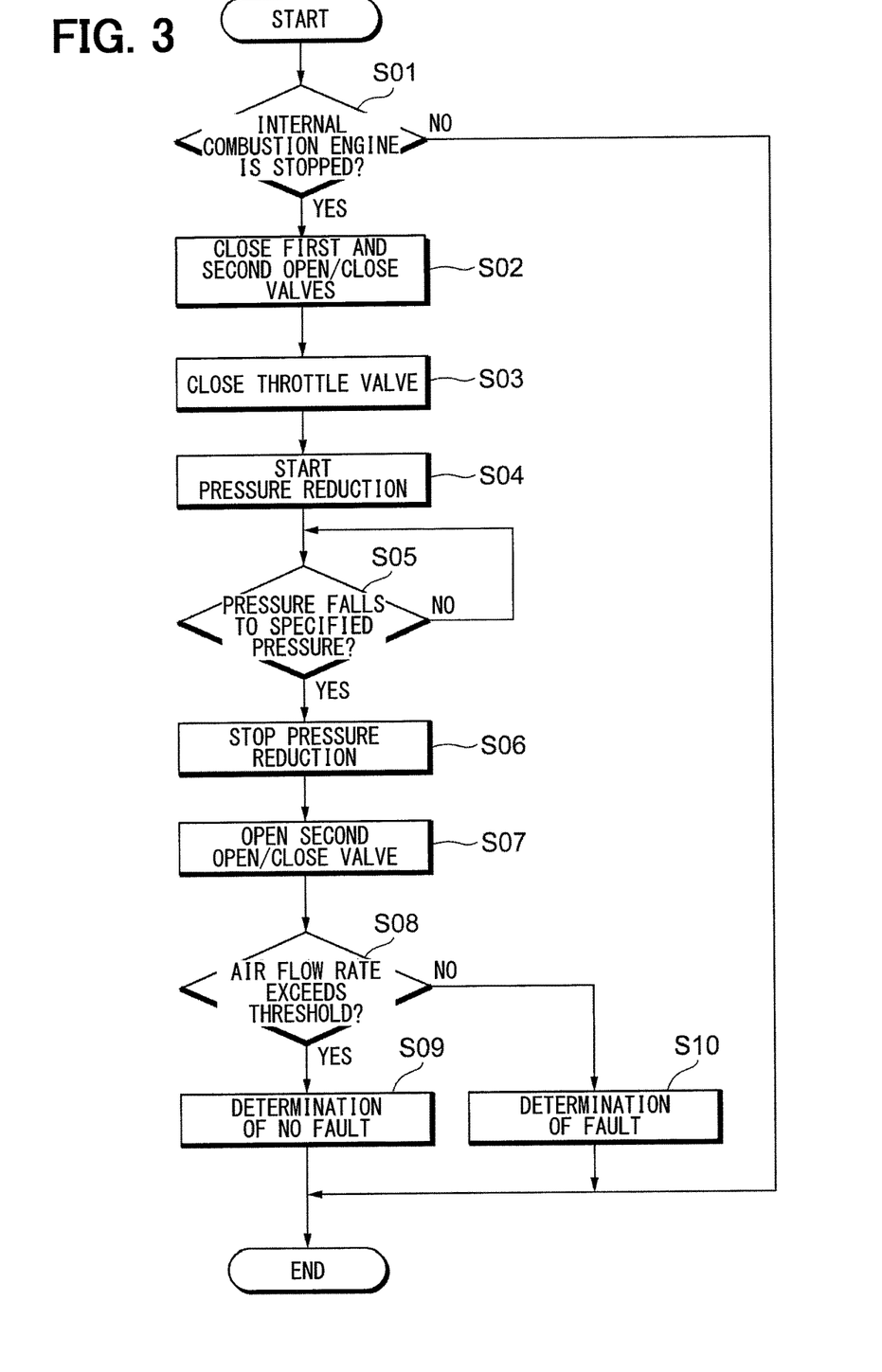
FIG. 3 is a flowchart showing a processing which the fault diagnosis device shown in FIG. 1 executes.

Referring to FIG. 3, a processing for abnormality determination which the control unit 90 executes will be described. The processing shown in FIG. 3 is repeatedly executed at a specified interval.

In step S01, it is determined whether the internal combustion engine 10 is operated. When the internal combustion engine 10 is operated, the processing shown in FIG. 3 is terminated. When the internal combustion engine 10 is stopped, the procedure proceeds to step S02.

In step S02, both of the first and the second open/close valve 71, 72 are closed. In step S03, the throttle valve 23 is fully closed. In step S04, the pressure reduction pump 41 is driven to start the pressure reduction in the evaporative-gas purge pipe 60. After that, the measure pressure gradually falls.

In step S05, it is determined whether the measure pressure falls to the threshold PT. When the measure pressure is higher than the threshold PT, the process in step S05 is repeatedly executed. When the measure pressure is not higher than the threshold PT, the procedure proceeds to step S06.

In step S06, the pressure reduction pump 41 is stopped. In step S07, the second open/close valve 72 is opened. Thus, the air flows into the second purge pipe 62 from the intake pipe 20.

In step S08, it is monitored whether the flow rate measured by the flow rate sensor 81 exceeds the threshold QTH. When the flow rate exceeds the threshold QTH as shown by the dashed-line DL1 in FIG. 2(F), the procedure proceeds to step S09. In step S09, it is determined that the second purge pipe 62 has no fault. When the flow rate does not exceed the threshold QTH as shown by a solid line in FIG. 2(F), the procedure proceeds to step S10. In step S10, it is determined that a fault occurs in the detection area "A" of the second purge pipe 62.

According to the present embodiment as described above, the fault diagnosis device 100 closes the first and the second open/close valve 71, 72, and then performs a pressure reduction by the pressure reduction pump 41. After that, the fault diagnosis device 100 determines whether a fault occurs in the second purge pipe 62 between the second open/close valve 72 and the intake pipe 20 (in the detection area "A") based on a measured value measured by the flow rate sensor 81 immediately after the second open/close valve 72 is opened.

Specifically, when the flow rate measured by the flow rate sensor 81 does not exceed the threshold QTH immediately after the second open/close valve 72 is opened, it is determined that a fault occurs in the detection area "A". With this configuration, even when the internal combustion engine is stopped, it can be determined whether a fault occurs in the second purge pipe 62 based on a measured value measured by the flow rate sensor 81.

Thus, in a case where the fault diagnosis device 100 is mounted on a plug-in hybrid vehicle which is frequency stopped, a frequency of fault diagnosis of the evaporative-gas purge pipe 60 can be fully ensured.

According to the present embodiment, at a time (t30) which is before the pressure reduction pump 41 starts discharging, the throttle valve is fully closed. Thus, it can be avoided that the flow rate of air flowing from the internal combustion engine 10 into the second purge pipe 62 is excessively increased and an air flow rate is varied according to a driving condition of the internal combustion engine 10. The fault diagnosis can be stably executed based on a measured value measured by the flow rate sensor 81.

Figure 4:
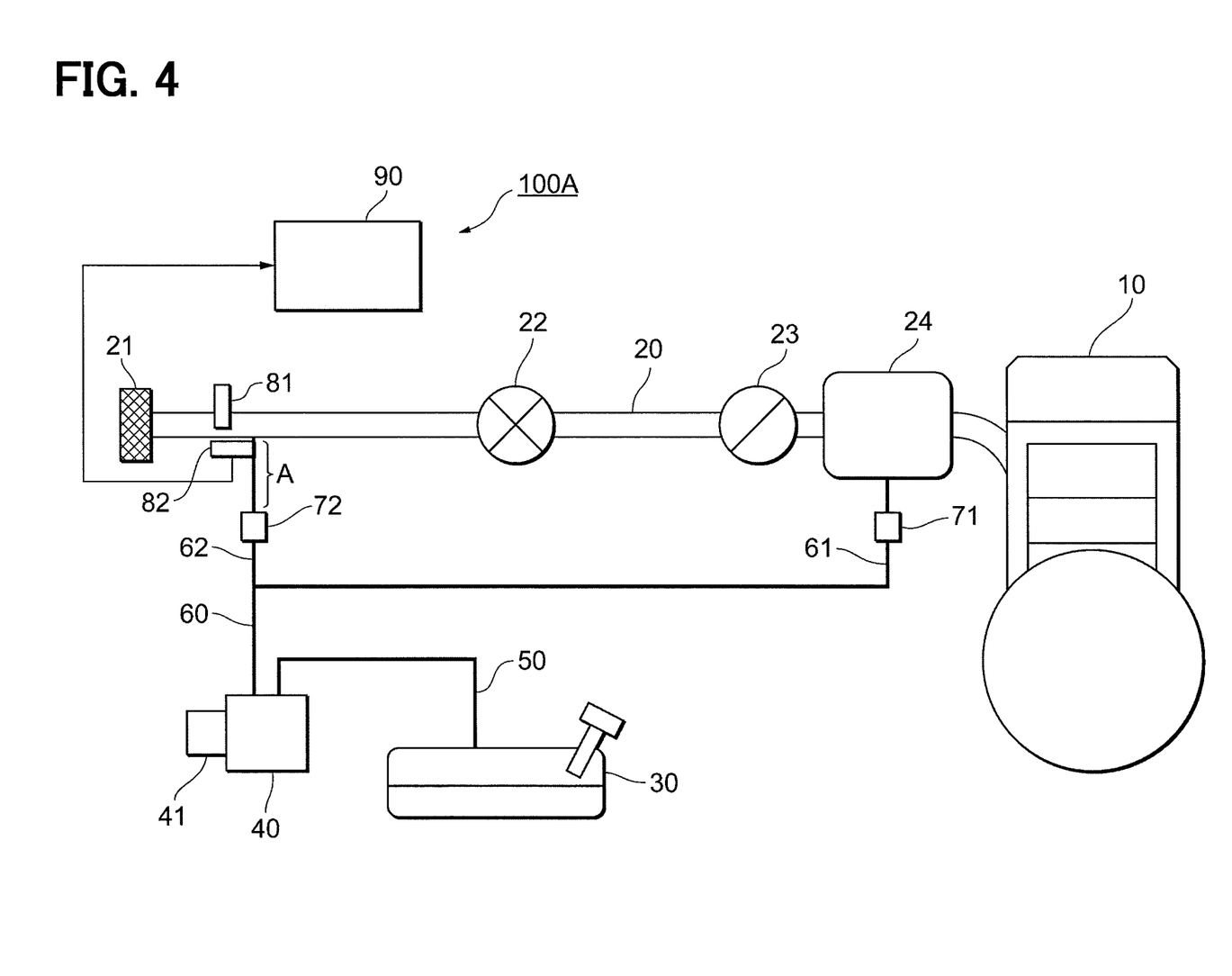
FIG. 4 is a chart schematically showing a fault diagnosis device and an internal combustion engine on which the fault diagnosis device is mounted, according to a second embodiment.

Referring to FIG. 4, and fault diagnosis device 100A according to the second embodiment will be described. The fault diagnosis device 100A is different from the first embodiment in that a flow rate sensor 82 is disposed in the second purge pipe 62. The other configuration is the same as the first embodiment.

The flow rate sensor 82 is a flow meter which measures flow rate of air flowing through the second purge pipe 62. The flow rate sensor 82 is arranged in the second purge pipe 62 close to the intake pipe 20. The flow rate measured by the flow rate sensor 82 is transmitted to the control unit 90. The flow rate sensor 82 corresponds to the "obtaining portion" in the present embodiment.

According to the present embodiment, it is determined whether a fault occurs in the detection area "A" based on the flow rate measured by the flow rate sensor 82 not by the flow rate sensor 81. That is, after the processes in step S01 to step S07 are executed, the flow rate of air flowing into the second purge pipe 62 from the intake pipe 20 is measured by the flow rate sensor 82 (not by the flow rate sensor 81), and then it is determined whether a fault occurs based on the measured value.

When no fault occurs in the detection area "A", the measured value measured by the flow rate sensor 82 is large. When a fault occurs in the detection area "A", the measured value measured by the flow rate sensor 82 is small. Thus, an abnormality determination can be executed according to the same way as the first embodiment. That is, when the flow rate measured by the flow rate sensor 82 exceeds the predetermined threshold immediately after the second open/close valve 72 is opened, it is determined that no fault occurs in the second purge pipe 62 between the second open/close valve 72 and the intake pipe 20 (detection area "A"). Meanwhile, when the flow rate measured by the flow rate sensor 82 does not exceed the predetermined threshold immediately after the second open/close valve 72 is opened, it is determined that a fault occurs in the detection area "A".

When the abnormality determination is executed, a condition of each part is varied similar to the first embodiment as shown in FIG. 2. Moreover, the processing of the abnormality determination is the same as the first embodiment as shown in FIG. 3. Thus, a specific explanation referring to drawings is omitted.

Since the flow rate of air flowing from the air filter 21 and the intake manifold 24 is measured by the flow rate sensor 82, the abnormality determination can be executed with high accuracy.

According to the above first embodiment and the second embodiment, it is determined whether a fault occurs in the detection area "A" based on the flow rate of air flowing from the intake pipe 20 into the second purge pipe 62. However, it can be determined whether a fault occurs in the detection area "A" based on a physical quantity which varies according to the flow rate of air flowing from the intake pipe 20 to the second purge pipe 62. Such an example will be explained hereinafter.

Figure 5:
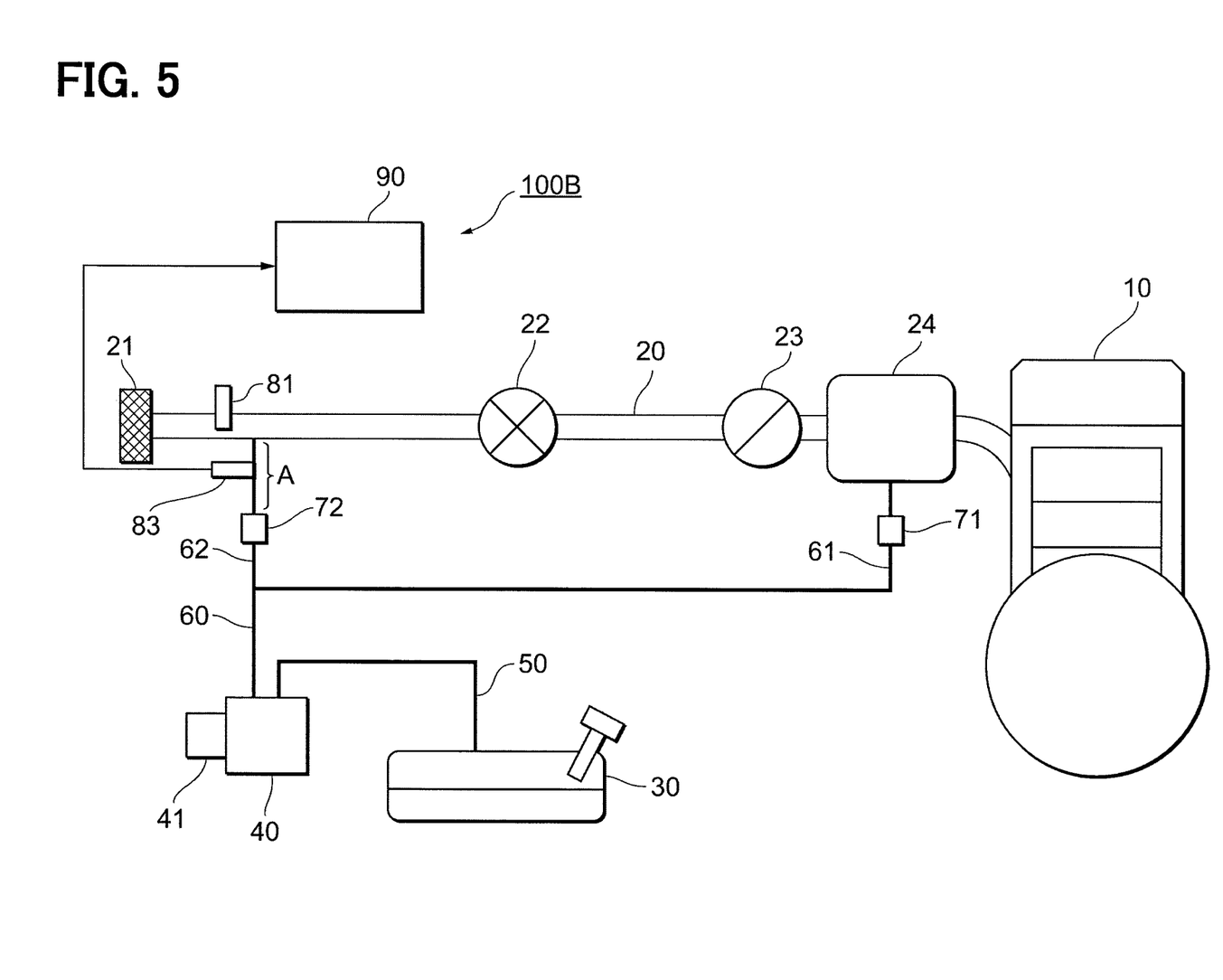
FIG. 5 is a chart schematically showing a fault diagnosis device and an internal combustion engine on which the fault diagnosis device is mounted, according to a third embodiment.

Referring to FIG. 5, a fault diagnosis device 100B according to a third embodiment will be described. The fault diagnosis device 100B is different from the first embodiment in that a pressure sensor 83 is disposed in the second purge pipe 62. The other configuration is the same as the first embodiment.

The pressure sensor 83 is a pressure gauge which measures pressure of air flowing through the second purge pipe 62. The pressure sensor 83 is arranged in the second purge pipe 62 between the second open/close valve 72 and the intake pipe 20. The pressure measured by the pressure sensor 83 is transmitted to the control unit 90. The pressure sensor 83 corresponds to the "obtaining portion" in the present embodiment.

Figure 6:
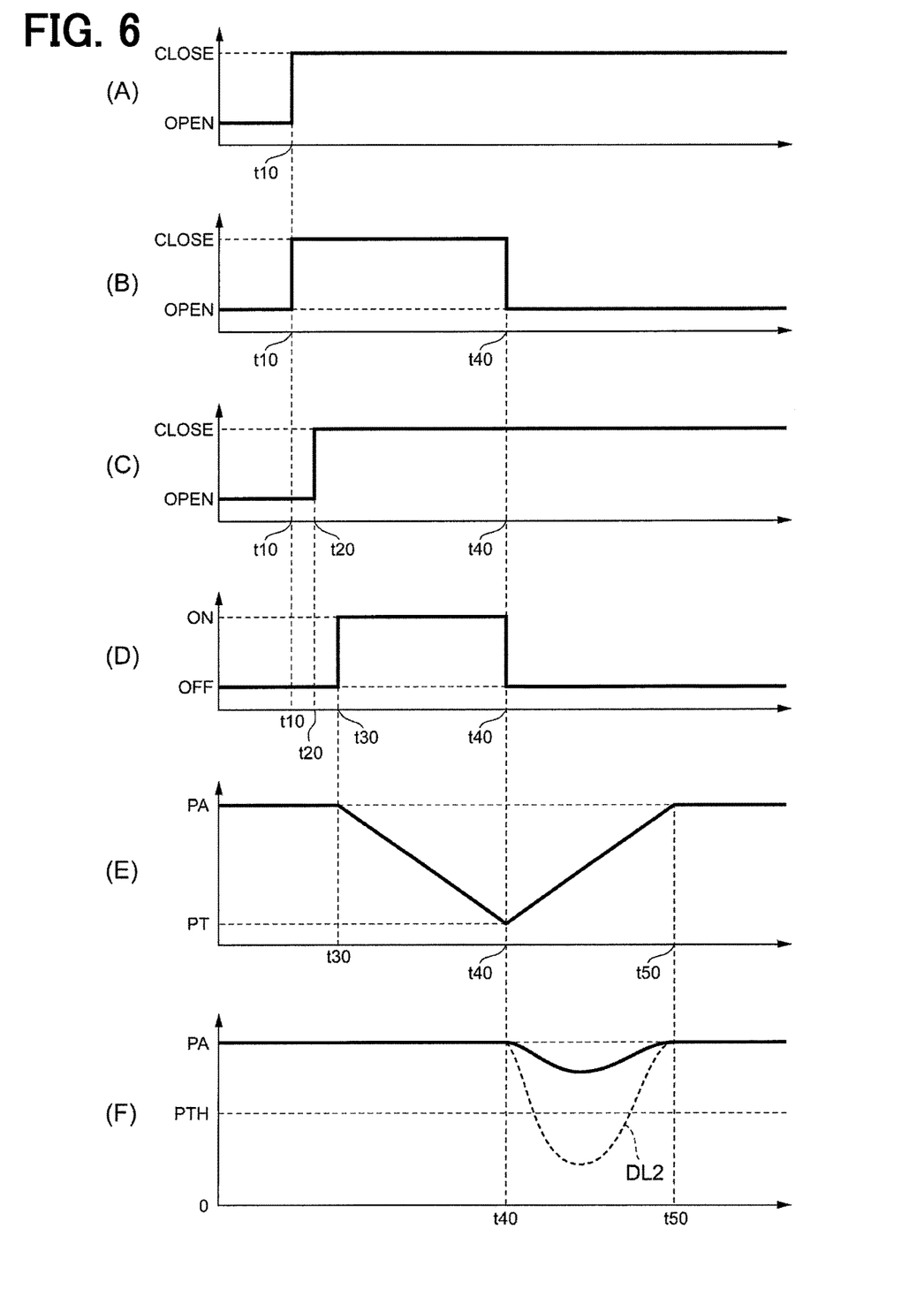
FIG. 6 is a time chart showing a condition change of each part when a diagnosis is executed by the fault diagnosis device shown in FIG. 5.

Referring to FIG. 6, an abnormality determination method which the fault diagnosis device 100b executes will be described. FIG. 6(A) shows a transition in open/close condition of the first open/close valve 71. FIG. 6(B) shows a transition in open/close condition of the second open/close valve 72. FIG. 6(C) shows a transition in open/close condition of the throttle valve 23. FIG. 6(D) shows a transition in operation condition of the pressure reduction pump 41. FIG. 6(E) shows a transition in pressure in the evaporative-gas purge pipe 60, which the pressure reduction pump 41 measures. FIG. 6(F) shows a transition in pressure which is measured by the pressure sensor 83.

The fault diagnosis device 100B executes the abnormality determination while the internal combustion engine 10 is stopped. At a time of t10, the first open/close valve 71 is closed (FIG. 6(A)). At the same time, the second open/close valve 72 is also closed (FIG. 6(B)). Then, at a time t20, the throttle valve 23 is fully closed (FIG. 6(C)). Above controls of the first open/close valve 71, the second open/close valve 72, and the throttle valve 23 are executed by the control unit 90.

At the time of t20, the pressure reduction pump 41 is stopped. Thus, the internal pressure of the evaporative-gas purge pipe 60, which pressure reduction pump 41 measures, is the atmospheric-pressure PA (FIG. 6 (E)). Moreover, the pressure value measured by the pressure sensor 83 is atmospheric-pressure PA (FIG. 6 (F)).

At a time of t30 after the time of t20, the pressure reduction pump 41 which has been stopped is started to start a pressure reduction in the evaporative-gas purge pipe 60 (FIG. 6 (D)). Thus, after the time of t30, the internal pressure of the evaporative-gas purge pipe 60 close to the pressure reduction pump 41 relative to the first open/close valve 71 and the second open/close valve 72 is gradually decreased (FIG. 6(E)).

The control unit 90 stops the pressure reduction pump 41 at a time when the measure pressure falls to a specified threshold PT (FIG. 6 (D), FIG. 6 (E)). At a time of t40, the control unit 90 opens the second open/close valve 72 (FIG. 6(B)). Thereby, since the air flows into the second purge pipe 62 from the intake pipe 20, the measure pressure is gradually increased after the time of t40. Air in the second purge pipe 62 flows from the pressure sensor 83 into the second open/close valve 72, whereby the pressure measured by the pressure sensor 83 is decreased (FIG. 6(F)).

The air in the intake pipe 20 flows into the second purge pipe 62 and the fresh air is introduced into the intake pipe 20 through the air filter 21. When the measure pressure rises to the atmospheric-pressure PA at a time of t50, the air stops flowing into the second purge pipe 62. The air pressure measured by the pressure sensor 83 starts to decrease at the time of t40 and then starts increasing immediately. Then, the air pressure becomes the atmospheric-pressure PA at a timing close to the time of t50 (FIG. 6(F)).

When a fault occurs in the detection area "A" of the second purge pipe 62 in FIG. 5, the air pressure variation measured by the pressure sensor 83 becomes small after the time of t40. This is because outside air flows into the second purge pipe 62 through the abnormal portion and less air flows into the second purge pipe 62 from the intake pipe 20. FIG. 6(F) shows a case where the measured pressure variation is decreased due to a fault in the detection area "A". A dashed-line DL2 in FIG. 6(F) shows a variation in measured pressure in a case where no fault occurs in the detection area "A".

The fault diagnosis device 100B determines whether a fault occurs in the detection area "A" based on a physical quantity which varies according to flow rate of air flowing into the second purge pipe 62, specifically, based on the pressure measured by the pressure sensor 83. The pressure measured by the pressure sensor 83 is information about the flow rate of air flowing from the intake pipe 20 into the second purge pipe 62.

Specifically, when the pressure measured by the pressure sensor 83 does not fall below a specified threshold PTH immediately after the second open/close valve 72 is opened, it is determined that a fault occurs in the second purge pipe 62 between the second open/close valve 72 and the intake pipe 20 (that is, in the detection area "A"). Meanwhile, when the pressure measured by the pressure sensor 83 falls below the threshold PTH immediately after the second open/close valve 72 is opened as shown by the dashed-line DL2, it is determined that no fault occurs in the detection area "A".

Figure 7:
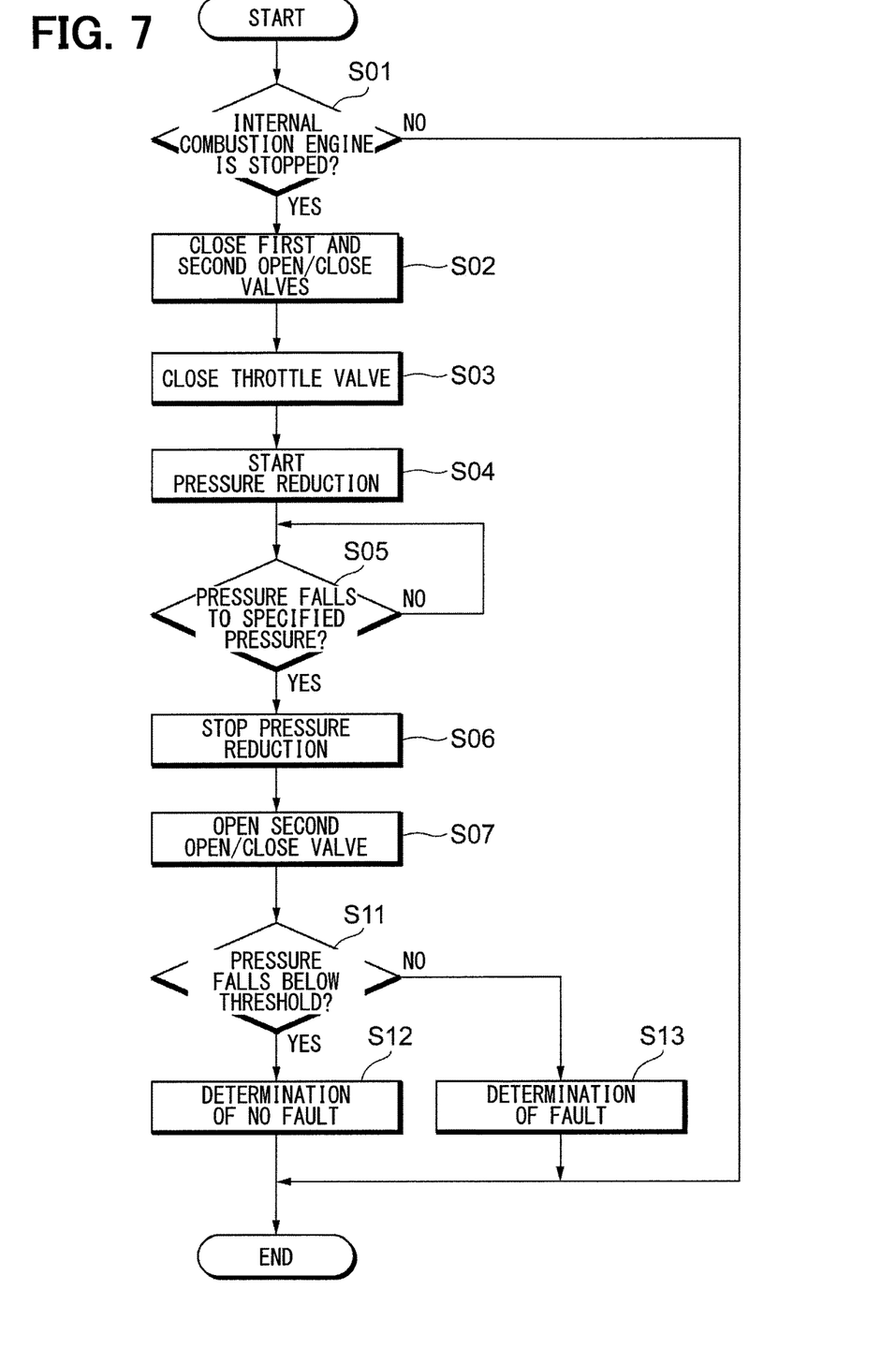
FIG. 7 is a flowchart showing a processing which the fault diagnosis device shown in FIG. 5 executes.

Referring to FIG. 7, a processing for abnormality determination which the control unit 90 executes will be described. The processing shown in FIG. 7 is repeatedly executed at a specified interval.

The processes in step S01 to step S07 shown in FIG. 7 are the same as the processes in step S01 to step S06 shown in FIG. 3. Thus, the processes after step S11 will be described.

After the process in step S07 is executed, the air flows into the second purge pipe 62 from the intake pipe 20. In step S11, it is monitored whether the pressure measured by the pressure sensor 83 falls below the threshold PTH. When the pressure falls below the threshold PTH as shown by the dashed-line DL2 in FIG. 6(F), the procedure proceeds to step S12. In step S12, it is determined that the second purge pipe 62 has no fault. When the flow rate does not fall below the threshold PTH as shown by a solid line in FIG. 6(F), the procedure proceeds to step S13. In step S13, it determined that a fault occurs in the detection area "A" of the second purge pipe 62.

According to the present embodiment as described above, the fault diagnosis device 100B closes the first and the second open/close valve 71, 72, and then performs a pressure reduction by the pressure reduction pump 41. After that, the fault diagnosis device 100B determines whether a fault occurs in the second purge pipe 62 between the second open/close valve 72 and the intake pipe 20 (in the detection area "A") based on a measured value measured by the pressure sensor 83 immediately after the second open/close valve 72 is opened.

Specifically, when the pressure measured by the pressure sensor 83 does not fall below the threshold PTH immediately after the second open/close valve 72 is opened, it is determined that a fault occurs in the detection area "A". With this configuration, even when the internal combustion engine is stopped, it can be determined whether a fault occurs in the second purge pipe 62 based on a measured value measured by the pressure sensor 83.

Thus, in a case where the fault diagnosis device 100B is mounted on a plug-in hybrid vehicle which is frequency stopped, a frequency of fault diagnosis of the evaporative-gas purge pipe 60 can be fully ensured.

According to the present embodiment, similar to the first embodiment, at a time (t30) which is before the pressure reduction pump 41 starts discharging, the throttle valve 23 is fully closed. Thus, it can be avoided that the flow rate of air flowing from the internal combustion engine 10 into the second purge pipe 62 is excessively increased and an air flow rate is varied according to a driving condition of the internal combustion engine 10. The fault diagnosis can be stably executed based on a measured value measured by the pressure sensor 83.

Referring to specific examples, the embodiments have been described above. However, the present disclosure is not limited to above examples. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fault diagnosis device determining whether a fault occurs in an evaporative-gas purge pipe which is provided to an internal combustion engine with a supercharger, the evaporative-gas purge pipe including a first purge pipe through which an evaporative-gas generated in a fuel tank flows into an intake pipe downstream of a compressor, and a second purge pipe through which the evaporative-gas flows into the intake pipe upstream of the compressor, the intake pipe supplying an air to the internal combustion engine, the fault diagnosis device comprising:
   a first open/close valve provided to the first purge pipe;
   a second open/close valve provided to the second purge pipe;
   a pressure reduction pump reducing both of a pressure in the first purge pipe between the first open/close valve and the fuel tank and a pressure in the second purge pipe between the second open/close valve and the fuel tank;
   an obtaining portion obtaining a flow rate information relating to a flow rate of an air flowing into the second purge pipe from the intake pipe; and
   a control unit controlling an operation of whole of the fault diagnosis device, wherein
   when the internal combustion engine is stopped, the pressure reduction pump performs a pressure reduction while the first open/close valve and the second open/close valve are closed,
   subsequently, the control unit determines whether a fault occurs in the second purge pipe between the second open/close valve and the intake pipe based on the flow rate information which is obtained immediately after the second open/close valve is opened, and
   the obtaining portion is located upstream of the compressor inside the intake pipe.

2. The fault diagnosis device according to claim 1, wherein
   the flow rate information is an air flow rate measured by a flow meter which is provided to the intake pipe, and
   when the air flow rate measured by the flow meter does not exceed a predetermined threshold immediately after the second open/close valve is opened, the control unit determines that a fault occurs in the second purge pipe between the second open/close valve and the intake pipe.

3. The fault diagnosis device according to claim 1, wherein
   the flow rate information is an air flow rate measured by a flow meter which is provided to the second purge pipe, and
   when the air flow rate measured by the flow meter does not exceed a predetermined threshold immediately after the second open/close valve is opened, the control unit determines that a fault occurs in the second purge pipe between the second open/close valve and the intake pipe.

4. The fault diagnosis device according to claim 1, wherein
   the flow rate information is an air pressure measured by a pressure gauge provided to the second purge pipe, and
   when the air pressure measured by the pressure gauge does not exceed a predetermined threshold immediately after the second open/close valve is opened, the control unit determines that a fault occurs in the second purge pipe between the second open/close valve and the intake pipe.

5. The fault diagnosis device according to claim 1, wherein
   the intake pipe is provided with a throttle valve between a connection portion of the first purge pipe and the compressor for adjusting an air flow rate supplied to the internal combustion engine, and
   the control unit fully closes the throttle valve in advance when the second open/close valve is opened to determine whether a fault occurs.

* * * * *